Dec. 13, 1955

J. VAILLANT 2,726,879

SEMISPHERICAL FIFTH WHEEL SUPPORT FOR SEMITRAILER

Filed Aug. 4, 1952

INVENTOR:-
JEAN VAILLANT

BY:- Chatwin & Company
ATTYS.

Dec. 13, 1955  J. VAILLANT  2,726,879
SEMISPHERICAL FIFTH WHEEL SUPPORT FOR SEMITRAILER
Filed Aug. 4, 1952  2 Sheets-Sheet 2
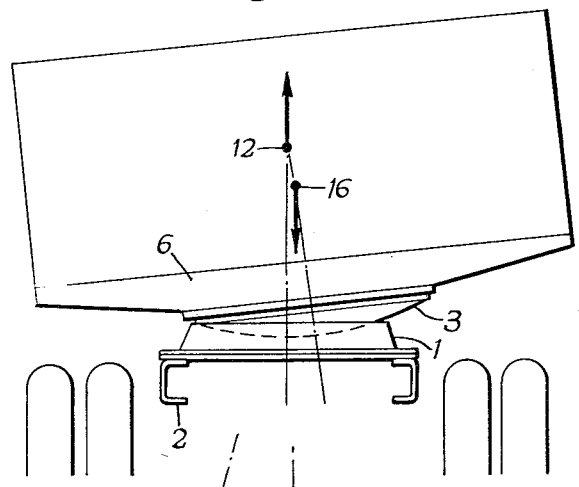
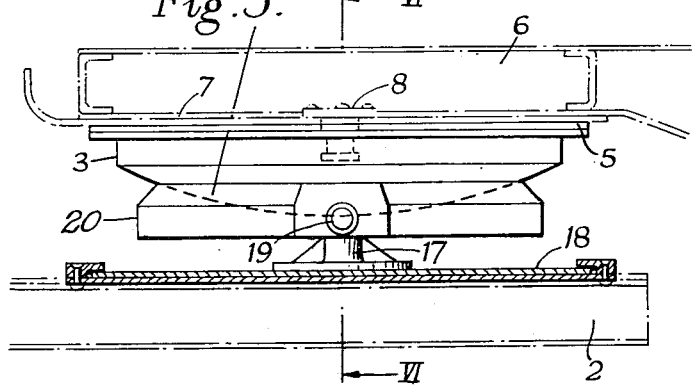
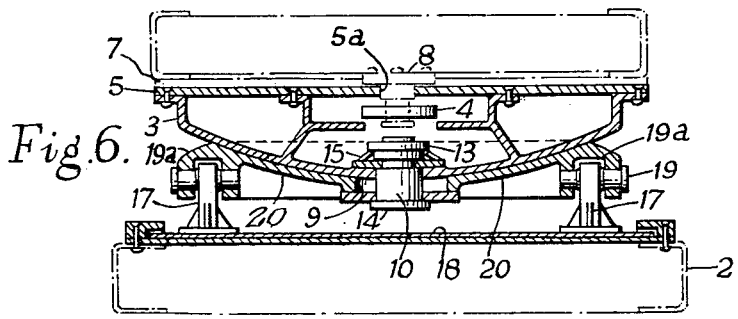
INVENTOR:-
JEAN VAILLANT
By:- Chatwin & Company.
ATTYS.

United States Patent Office 2,726,879
Patented Dec. 13, 1955

2,726,879

SEMISPHERICAL FIFTH WHEEL SUPPORT FOR SEMITRAILER

Jean Vaillant, Marseille, France

Application August 4, 1952, Serial No. 302,505

Claims priority, application France August 10, 1951

2 Claims. (Cl. 280—438)

This invention relates to universal hitch means for semi-trailer vehicles, its object being to provide an improved form of construction which provides for good stability of the semi-trailer whilst permitting adequate relative movement of the trailer with respect to the towing vehicle, particularly in the direction longitudinally thereof.

Two embodiments of the invention are illustrated in the accompanying drawings, wherein:

Fig. 4 is a schematic end elevation, viewed in the longitudinal direction of the towing vehicle, to illustrate the manner of tilting of the trailer.

Fig. 5 is a side elevation of a second embodiment of hitch.

Fig. 6 is a transverse vertical section taken on the line VI—VI of Fig. 5.

Figure 1:
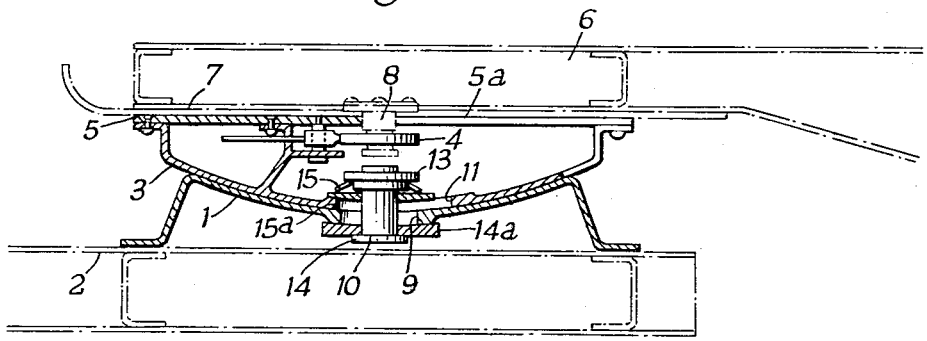
Fig. 1 is a longitudinal vertical section of a first embodiment of hitch means.
Figure 2:
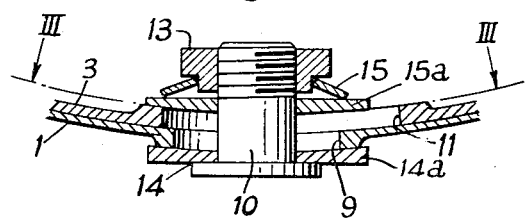
Fig. 2 is a detail of Fig. 1 on a larger scale and taken on the line II—II of Fig. 3.
Figure 3:
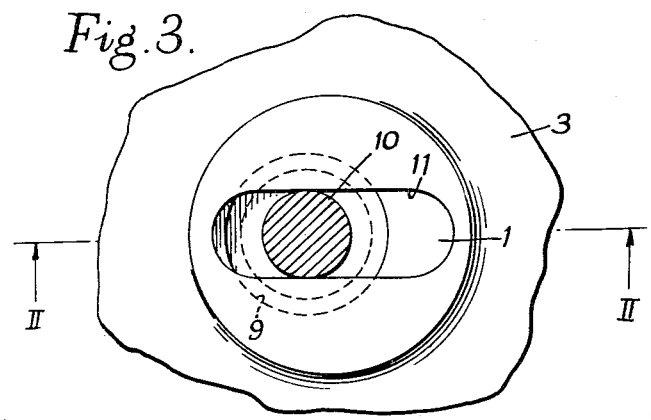
Fig. 3 is a partial horizontal section of the detail shown and taken on the line III—III in Fig. 2.

In Figs. 1 to 3, 1 is a spherical mounting secured on part of the frame 2 of a towing vehicle. On the mounting 1 is seated a correspondingly spherical bearing member 3 secured permanently to the underside of a bearing plate 5. A trailer vehicle 6 has a bearing surface 7 bearing on the plate 5, and carrying a depending king-pin 8 which can be held, by locking means 4, at the forward end of a segmental opening 5a in the bearing plate 5. The mounting 1 has a central aperture 9 through which is passed a coupling pin 10 which also passes through a longitudinal slot 11 in the bearing member 3. The pin 10 is provided at its upper end with a head 13 and at its lower end with a nut 14 and washers 14a and 15a are arranged on the pin 10 respectively below the mounting 1 and above the bearing member 3. A spring 15 is arranged about the pin 10 and between the head 13 and the washer 15a to urge the bearing member 3 and mounting 1 together. It is preferable to make the radius of the bearing member and mounting large so that, as shown in Fig. 4, it can be greater than the distance of the center of gravity of the trailer from the mounting, whereby a particularly stable connection is obtained.

In the modification shown in Figs 5 and 6, the frame 2 of the tractor has a base plate 18 on which are bearings 17 for a horizontal pivot 19. The dished mounting 20 (corresponding to the mounting 1 of Figs. 1 to 3) has corresponding bearings 19a on said pivot 19 so that the mounting as a whole can tilt within limits in the longitudinal direction of the towing vehicle. The remainder of the hitch means is as described with reference to Figs. 1 to 3, with the exception that no longitudinal slot (as 11 in Figs. 1–3) is provided and longitudinal tilting is permitted entirely by the transverse pivot.

With the constructions described, the trailer can tilt in different directions with respect to the towing vehicle whilst still remaining coupled thereto. Transverse tilting is allowed by the transverse movement of the pin 10 in the aperture 9 of the mounting, and longitudinal tilting is allowed in Figs. 1 to 3 by the movement of the pin 10 in the longitudinal slot 11 of the bearing member whilst in the modification of Figs. 5 and 6, the longitudinal tilting of the trailer with respect to the towing vehicle is permitted by tilting of the mounting with respect to the towing vehicle.

I claim:

1. A universal semi-trailer hitch for connecting a semi-trailer to a towing vehicle comprising a spherically dished mounting secured in horizontal position on said towing vehicle and having a central aperture, a spherically domed bearing member of corresponding radius and having a central aperture seated in inverted position on said mounting, a coupling pin extending through the apertures in the mounting and bearing member to secure the two members together, said pin being of less width than the width of the central aperture of the dished mounting and fitting loosely therein, a bearing plate secured on the bearing member and having a segmental opening therein which opens rearwardly, a bearing surface on said semi-trailer bearing on the bearing plate, a king-pin secured to and depending from the bearing surface and engaged in the forward end of the segmental opening, and locking means on the bearing plate for engagement and retaining the king-pin in said opening.

2. A universal semi-trailer hitch, as claimed in claim 1, wherein the aperture in the spherically domed bearing member is elongated in the form of a slot aligned longitudinally of the semi-trailer and receives the coupling pin therethrough.

References Cited in the file of this patent

UNITED STATES PATENTS

| | | |
|---|---|---|
| 1,078,801 | Munsing | Nov. 18, 1913 |
| 1,211,825 | Curl | Jan. 9, 1917 |
| 1,261,261 | Menhall et al. | Apr. 2, 1918 |
| 1,399,250 | Cadman | Dec. 6, 1921 |
| 2,084,291 | Ranger | June 15, 1937 |
| 2,385,596 | Yager et al. | Sept. 25, 1945 |

FOREIGN PATENTS

| | | |
|---|---|---|
| 731,501 | France | May 30, 1932 |
| 210,225 | Great Britain | Jan. 31, 1924 |
| 215,422 | Great Britain | May 2, 1924 |
| 221,035 | Great Britain | Sept. 4, 1924 |